(12) United States Patent
Ha et al.

(10) Patent No.: US 9,013,320 B2
(45) Date of Patent: Apr. 21, 2015

(54) HOME APPLIANCE AND ITS SYSTEM

(71) Applicants: Sangdoo Ha, Changwon-si (KR);
Jinwook Lee, Changwon-si (KR);
Moonhyun Kim, Changwon-si (KR);
Deoghyeon Kim, Changwon-si (KR)

(72) Inventors: Sangdoo Ha, Changwon-si (KR);
Jinwook Lee, Changwon-si (KR);
Moonhyun Kim, Changwon-si (KR);
Deoghyeon Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 13/922,669

(22) Filed: Jun. 20, 2013

(65) Prior Publication Data

US 2014/0009300 A1      Jan. 9, 2014

(30) Foreign Application Priority Data

Jul. 9, 2012   (KR) ......................... 10-2012-0074500

(51) Int. Cl.
| | |
|---|---|
| G08B 21/00 | (2006.01) |
| H04B 13/02 | (2006.01) |
| G08B 1/08 | (2006.01) |
| G06F 11/30 | (2006.01) |

(Continued)

(52) U.S. Cl.
CPC .......... *G08B 21/187* (2013.01); *G05B 23/0205* (2013.01); *G05B 15/02* (2013.01); *G05B 23/027* (2013.01); *H04L 12/282* (2013.01)

(58) Field of Classification Search
USPC ........ 340/679, 825.22, 635, 539.24; 702/185, 702/188; 379/106.01; 714/27; 73/593
See application file for complete search history.

(56) References Cited

U.S. PATENT DOCUMENTS

| | | | |
|---|---|---|---|
| 3,910,322 | A | 10/1975 | Hardesty et al. |
| 4,146,754 | A | 3/1979 | Rose |

(Continued)

FOREIGN PATENT DOCUMENTS

| | | |
|---|---|---|
| CN | 1212304 | 3/1999 |
| CN | 1343862 | 4/2002 |

(Continued)

OTHER PUBLICATIONS

Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).

(Continued)

*Primary Examiner* — George Bugg
*Assistant Examiner* — Munear Akki
(74) *Attorney, Agent, or Firm* — Ked & Associates LLP

(57) ABSTRACT

Provided are a home appliance and its system. The home appliance include: an input unit for inputting driving information; a data unit for storing a diagnosis logic; a control unit for diagnosing a state of the home appliance and whether a failure occurs according to the diagnosis logic on the basis of product information including the driving information inputted from the input unit, operation information detected during an operation, and failure information occurring during an operation, in order to generate a diagnosis result including the operation information and the failure information, and encoding transmission information including predetermined data for a diagnosis, which are selected from the driving operation, and the diagnosis result and outputting the encoded transmission information; a modulator for converting the encoded transmission information; and a sound output unit for outputting the transmission information converted by the modulator as a sound including a plurality of frequencies.

15 Claims, 8 Drawing Sheets

(51) Int. Cl.

| | |
|---|---|
| *G06F 1/26* | (2006.01) |
| *H04M 11/00* | (2006.01) |
| *G06F 11/00* | (2006.01) |
| *G08B 21/18* | (2006.01) |
| *G05B 23/02* | (2006.01) |
| *G05B 15/02* | (2006.01) |
| *H04L 12/28* | (2006.01) |

(56) References Cited

U.S. PATENT DOCUMENTS

| | | | |
|---|---|---|---|
| 4,766,505 | A | 8/1988 | Nakano et al. |
| 4,797,656 | A | 1/1989 | Keppler |
| 4,897,659 | A | 1/1990 | Mellon |
| 4,897,857 | A | 1/1990 | Wakatsuki et al. |
| 4,916,439 | A | 4/1990 | Estes et al. |
| 4,977,394 | A | 12/1990 | Manson et al. |
| 5,103,214 | A | 4/1992 | Curran et al. |
| 5,210,784 | A | 5/1993 | Wang et al. |
| 5,268,666 | A | 12/1993 | Michel et al. |
| 5,452,344 | A | 9/1995 | Larson |
| 5,506,892 | A | 4/1996 | Kojima et al. |
| 5,586,174 | A | 12/1996 | Bogner et al. |
| 5,664,218 | A | 9/1997 | Kim et al. |
| 5,757,643 | A | 5/1998 | Kuroda et al. |
| 5,774,529 | A | 6/1998 | Johannsen et al. |
| 5,864,828 | A | 1/1999 | Atkins |
| 5,939,992 | A | 8/1999 | Devries et al. |
| 5,940,915 | A | 8/1999 | Nam |
| 5,987,105 | A * | 11/1999 | Jenkins et al. ........... 379/106.01 |
| 6,121,593 | A | 9/2000 | Mansbery et al. |
| 6,157,313 | A | 12/2000 | Emmermann |
| 6,424,252 | B1 | 7/2002 | Adler |
| 6,727,814 | B2 | 4/2004 | Saltzstein et al. |
| 6,759,954 | B1 | 7/2004 | Myron et al. |
| 6,763,458 | B1 | 7/2004 | Watanabe et al. |
| 6,778,868 | B2 | 8/2004 | Imamura et al. |
| 6,784,801 | B2 | 8/2004 | Watanabe et al. |
| 6,870,480 | B2 | 3/2005 | Suzuki et al. |
| 6,873,255 | B2 | 3/2005 | Gallagher |
| 6,906,617 | B1 | 6/2005 | Van der Meulen |
| 7,010,612 | B1 | 3/2006 | Si et al. |
| 7,135,982 | B2 | 11/2006 | Lee |
| 7,174,264 | B2 | 2/2007 | Yasukawa et al. |
| 7,243,174 | B2 | 7/2007 | Sheahan et al. |
| 7,266,164 | B2 | 9/2007 | Jeon et al. |
| 7,280,643 | B2 | 10/2007 | Howard et al. |
| 7,337,457 | B2 | 2/2008 | Pack et al. |
| 7,363,031 | B1 | 4/2008 | Aisa |
| 7,383,644 | B2 | 6/2008 | Lyu et al. |
| 7,439,439 | B2 | 10/2008 | Hayes et al. |
| 7,509,824 | B2 | 3/2009 | Park et al. |
| 7,558,700 | B2 | 7/2009 | Yamashita et al. |
| 7,574,269 | B2 | 8/2009 | Cenedese et al. |
| 7,631,063 | B1 | 12/2009 | Ho et al. |
| 7,648,476 | B2 | 1/2010 | Bock et al. |
| 7,653,512 | B2 | 1/2010 | Cheung et al. |
| 7,750,227 | B2 | 7/2010 | Hayes et al. |
| 7,843,819 | B1 | 11/2010 | Benveniste |
| 7,965,632 | B2 | 6/2011 | Sugaya |
| 8,027,752 | B2 | 9/2011 | Castaldo et al. |
| 8,040,234 | B2 | 10/2011 | Ebrom et al. |
| 8,045,636 | B1 | 10/2011 | Lee et al. |
| 8,132,049 | B2 | 3/2012 | Yasukawa et al. |
| 8,204,189 | B2 | 6/2012 | Rhodes et al. |
| 8,325,054 | B2 * | 12/2012 | Kim et al. ..................... 340/679 |
| 8,391,255 | B2 | 3/2013 | Ribiere et al. |
| 8,428,910 | B2 | 4/2013 | Papadimitriou et al. |
| 2002/0029575 | A1 | 3/2002 | Okamoto |
| 2002/0032491 | A1 | 3/2002 | Imamura et al. |
| 2002/0078742 | A1 | 6/2002 | Kim |
| 2002/0097161 | A1 | 7/2002 | Deeds |
| 2002/0116959 | A1 | 8/2002 | Ohta et al. |
| 2002/0120728 | A1 | 8/2002 | Braatz et al. |
| 2003/0028345 | A1 | 2/2003 | Watkins et al. |
| 2003/0058101 | A1 | 3/2003 | Watanabe et al. |
| 2003/0110363 | A1 | 6/2003 | Bachot et al. |
| 2003/0128850 | A1 | 7/2003 | Kimura et al. |
| 2003/0144010 | A1 | 7/2003 | Dollinger |
| 2003/0167782 | A1 | 9/2003 | Roh et al. |
| 2003/0196492 | A1 | 10/2003 | Remboski et al. |
| 2004/0032853 | A1 | 2/2004 | D'Amico et al. |
| 2004/0132444 | A1 | 7/2004 | Herrmann |
| 2004/0158333 | A1 | 8/2004 | Ha et al. |
| 2004/0211228 | A1 | 10/2004 | Nishio et al. |
| 2004/0249903 | A1 | 12/2004 | Ha et al. |
| 2004/0261468 | A1 | 12/2004 | Lueckenbach |
| 2005/0015890 | A1 | 1/2005 | Kim et al. |
| 2005/0028034 | A1 | 2/2005 | Gantman et al. |
| 2005/0029976 | A1 | 2/2005 | Terry et al. |
| 2005/0086979 | A1 | 4/2005 | Son et al. |
| 2005/0129200 | A1 | 6/2005 | Forrest et al. |
| 2005/0134472 | A1 | 6/2005 | Jang et al. |
| 2005/0162909 | A1 | 7/2005 | Wooldridge |
| 2005/0222859 | A1 | 10/2005 | Ha |
| 2006/0048405 | A1 | 3/2006 | Baek et al. |
| 2006/0066758 | A1 | 3/2006 | Higashihara |
| 2006/0089818 | A1 | 4/2006 | Norell et al. |
| 2006/0136544 | A1 | 6/2006 | Atsmon et al. |
| 2006/0168740 | A1 | 8/2006 | Ha et al. |
| 2006/0259199 | A1 | 11/2006 | Gjerde et al. |
| 2007/0113595 | A1 | 5/2007 | Harwood et al. |
| 2007/0137265 | A1 | 6/2007 | Shikamori et al. |
| 2007/0175883 | A1 | 8/2007 | Miu et al. |
| 2007/0189323 | A1 | 8/2007 | Swoboda et al. |
| 2007/0219756 | A1 | 9/2007 | Frankel et al. |
| 2007/0272286 | A1 | 11/2007 | Curtius et al. |
| 2008/0036619 | A1 | 2/2008 | Rhodes et al. |
| 2008/0072383 | A1 | 3/2008 | Bextermoller et al. |
| 2008/0122648 | A1 | 5/2008 | Ebrom et al. |
| 2008/0181058 | A1 | 7/2008 | Hayakawa |
| 2009/0036778 | A1 | 2/2009 | Cohen et al. |
| 2009/0067102 | A1 | 3/2009 | Cline et al. |
| 2009/0160637 | A1 | 6/2009 | Maeng |
| 2009/0169434 | A1 | 7/2009 | Ogusu |
| 2009/0282308 | A1 | 11/2009 | Gutsche et al. |
| 2009/0323914 | A1 * | 12/2009 | Lee et al. .................. 379/106.01 |
| 2010/0023938 | A1 | 1/2010 | Lee et al. |
| 2010/0027770 | A1 | 2/2010 | Park et al. |
| 2010/0037401 | A1 | 2/2010 | Bae et al. |
| 2010/0116060 | A1 | 5/2010 | Murayama |
| 2010/0318324 | A1 | 12/2010 | Kim et al. |
| 2011/0022358 | A1 | 1/2011 | Han et al. |
| 2011/0060553 | A1 * | 3/2011 | Han et al. ...................... 702/185 |
| 2011/0074589 | A1 | 3/2011 | Han et al. |
| 2011/0200189 | A1 | 8/2011 | True et al. |

FOREIGN PATENT DOCUMENTS

| | | |
|---|---|---|
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017520 | 4/2011 |
| EP | 0 038 687 | 10/1981 |
| EP | 0 510 519 | 10/1992 |
| EP | 0 617 557 | 9/1994 |
| EP | 0 691 060 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 4-358497 | 12/1992 |
| JP | 04-358497 | 12/1992 |

(56) References Cited

FOREIGN PATENT DOCUMENTS

| | | |
|---|---|---|
| JP | 07-239176 | 9/1995 |
| JP | 10-133767 | 5/1998 |
| JP | 1-127254 | 5/1999 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 | 12/1991 |
| KR | 10-1996-0003308 | 1/1996 |
| KR | 10-1997-0019443 | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 | 4/2000 |
| KR | 10-2001-0036913 | 5/2001 |
| KR | 10-2001-0055394 | 7/2001 |
| KR | 10-2002-0020831 | 3/2002 |
| KR | 10-2002-0030426 | 4/2002 |
| KR | 10-2002-0039959 | 5/2002 |
| KR | 10-2003-0000189 | 1/2003 |
| KR | 10-2004-0050767 | 6/2004 |
| KR | 10-2004-0095017 | 11/2004 |
| KR | 10-2004-0103352 | 12/2004 |
| KR | 10-2005-0062747 | 6/2005 |
| KR | 10-2005-0097282 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0114309 | 11/2009 |
| KR | 10-2009-0115066 | 11/2009 |
| KR | 10-2009-0115078 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.
United States Office Action dated Dec. 27, 2011 issued in U.S. Appl. No. 12/432,184.
Russian Office Action dated Feb. 7, 2012. (with translation).
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
U.S. Office Action issued in U.S. Appl. No. 12/431,903 dated Mar. 8, 2012.
U.S. Office Action issued in U.S. Appl. No. 12/431,893 dated Mar. 19, 2012.
International Search Report issued in PCT Application No. KR2011/004949 dated Mar. 20, 2012.
U.S. Office Action issued in U.S. Appl. No. 12/432,132 dated Mar. 20, 2012.
International Search Report issued in PCT Application No. KR2011/004948 dated Mar. 26, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
Russian Office Action issued in Application No. 2010144513/08 dated Jun. 27, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.

(56) References Cited

OTHER PUBLICATIONS

U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
European Search Report dated Dec. 17, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
European Search Report dated Jan. 2, 2013.
U.S. Office Action issued in U.S. Appl. No. 12/431,903 dated Jan. 2, 2013.
U.S. Notice of Allowance issued in U.S. Appl. No. 12/847,303 dated Jan. 11, 2013.
U.S. Office Action issued in U.S. Appl. No. 12/757,246 dated Jan. 17, 2013.
Ethem M Sözer; "Simulation and Rapid Prototyping Environment for Underwater Acoustic Communications: Reconfigurable Modem"; Oceans—Europe 2005; MIT Sea Grant College Program; Cambridge, MA, 02139; IEEE; pp. 80-85 (XP10838461A).
U.S. Office Action issued in U.S. Appl. No. 12/431,893 dated Jan. 29, 2013.
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
U.S. Office Action issued in U.S. Appl. No. 12/842,649 dated Aug. 15, 2014.
Korean Notice of Allowance dated Aug. 30, 2013.
U.S. Office Action issued in U.S. Appl. No. 12/842,649 dated Oct. 8, 2013.
Chinese Office Action dated Oct. 10, 2013. (416610).
Chinese Office Action dated Oct. 10, 2013. (419110).
U.S. Notice of Allowance issued in U.S. Appl. No. 12/846,013 dated Nov. 5, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Australian Office Action dated Sep. 22, 2014.
Chinese Office Action dated Oct. 8, 2014.
U.S. Notice of Allowance issued in U.S. Appl. No. 13/382,334 dated Nov. 12, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
Chinese Office Action dated Oct. 30, 2014.
Japanese Office Action dated Nov. 18, 2014.
Chinese Office Action dated Dec. 3, 2014.

* cited by examiner

FIG. 6

|   |   | CONDITIONAL EQUATION 1 | CONDITIONAL EQUATION 2 |   | RESULT |
|---|---|---|---|---|---|
| 1 | A | a=0 | b≠0 | ..... | 101 |
| 2 | A | a=1 | b>1 | ..... | 102 |
| 3 | A | a=2 | b=0 | ..... | 103 |
| 4 | B | c=0 | 1≤ a ≤3 | ..... | 104 |
| 5 | B | c=1 | a=0 | ..... | 105 |
| 6 | C | d>1 | e>1 | ..... | 106 |
| 7 | D | e=0 | f=0 | ..... | 107 |
| 8 | D | e=1 | f=0 | ..... | 108 |
| ⋮ | ⋮ | ⋮ | ⋮ | ⋮ | ⋮ |

HOME APPLIANCE AND ITS SYSTEM

This application claims priority to Korean Patent application no. 10-2012-0074500 filed Jul. 9, 2012, which is hereby incorporated by reference.

BACKGROUND

1. Field

The present disclosure relates to a home appliance and its system, and more particularly, to a home appliance that checks and diagnoses its state and failure to send a diagnosis result in order to make After Service (A/S) easy, and its system.

2. Description of the Related Art

A home appliance may store setting values for operation, information occurring during operation, and failure information during its predetermined operation, (especially, it may output a predetermined alarm when a failure occurs). A user may therefore recognize the state of the home appliance. Such a home appliance may notify a simple operation completion or a failure occurrence, and also output specific failure information through an output means such as a display means or lamp.

Typically, a user contacts a service center when a home appliance breaks down, and then, a technician personally visits the user for repair. However, such a personal visit by a technician causes excessive costs and also, without prior information on the home appliance, it is difficult to repair the home appliance effectively. Later, with the development of technology, a telephone network is used to remotely diagnose failure information.

European patent application no. EP0510519 discloses a technique that sends failure information on a home appliance to a service center via a telephone network with a modem connected to the home appliance. However, in this case, there is a problem that the modem needs to be always connected the home appliance. Especially, since a home appliance such as a laundry washing machine is generally installed outdoors, there is difficulty connecting the laundry washing machine to the telephone network.

U.S. Pat. No. 5,987,105 discloses a method of controlling a home appliance that converts information on the operation of a home appliance into a sound signal and outputs it through a telephone network. Such a control method sends a sound signal outputted from a home appliance, to a service center through a user's phone. In terms of the structure of the data packets constituting the sound signal, the information to be transmitted into a plurality of packets for output. One packet is configured with a 2.97 sec duration, and when one packet is outputted, the next packet is outputted 730 ms later. Accordingly, outputting all the information to be transmitted takes more than 3 sec.

A portable terminal, such as a mobile phone or smart phone, provides a noise canceling function. When a signal having a predetermined frequency is continuously detected for a predetermined time (about 3 sec), such a noise canceling function recognizes the signal as noise. Furthermore, the sound signal intensity is drastically reduced or distorted by a communication environment when the sound signal is inputted to a portable terminal, as disclosed in U.S. Pat. No. 5,987, 105. Even when an idle period (for example, 730 ms) is set between packets (each length configured with less than 3 sec), the signal may still be recognized as noise. For reference, U.S. Pat. No. 5,987,105 provides no suggestion or recognition of the noise canceling function of a portable terminal, let alone a method of evading the above issue.

Therefore, it is necessary to provide an improved means for transmitting as much data on a home appliance as possible simultaneously in order to reduce signal loss or distortion due to the communication environment such as that caused by the noise cancelling functions of communications devices such as mobile telephones.

SUMMARY

Aspect of an invention are disclosed in the appended independent claims.

The foregoing and other objects, features, aspects and advantages of a device and method in accordance with the present disclosure will become more apparent from the following detailed description when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings:

FIG. 6 is a view illustrating a diagnosis logic and a diagnosis result according thereto in a home appliance;

DETAILED DESCRIPTION

Figure 1:
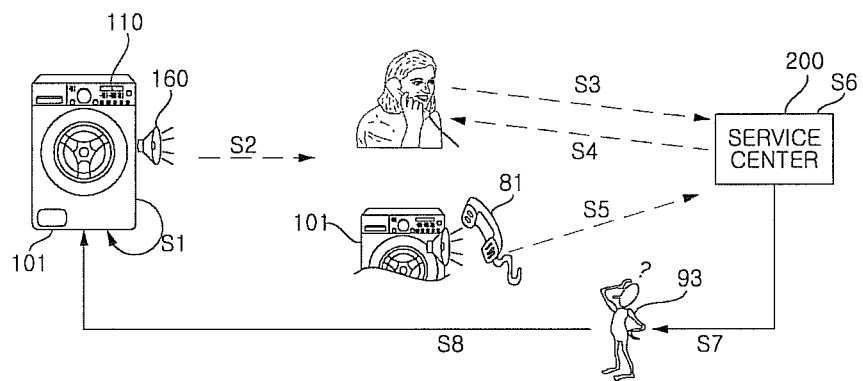
FIG. 1 is a diagram illustrating a configuration of a home appliance and a diagnostic system including a server according to an embodiment.

While specific terms are used, they are not used to limit the meaning or the scope of the present disclosure described in Claims, but merely used to explain the present disclosure. Accordingly, a person having ordinary skill in the art will understand from the above that various modifications and other equivalent embodiments are also possible. The invention is not restricted to the described embodiments but extends to the full scope of the accompanying Claims. Like reference numerals refer to like elements throughout.

FIG. 1 is a diagram illustrating a configuration of a home appliance and a diagnostic system including a server according to an embodiment.

Referring to FIG. 1, a home appliance system may include at least one home appliance 101 separately installed at a plurality of places and a service center 200 for managing home appliances. At this point, the service center 200 may include a customer response system through a phone, e-mail, and user's visit, and also a service managing data on home appliances. The home appliance 101 may include an input unit 110, a predetermined display unit, and a sound output unit 160 such as a buzzer and speaker for outputting a notification sound or confirmation sound.

The home appliance 101 may self-diagnose its state by using a built-in diagnostic logic in operation S1 when a command is inputted through the input unit 110, errors occur during an operation of the home appliance 101, or a set operation is completed.

At this point, the home appliance 101 may run the diagnostic logic on the basis of product information including driving information inputted from (or received by) the input unit 110, operation information detected during operation, and failure operation occurring during operation in order to check its state and diagnose whether a failure occurs, and according thereto, may generate and, optionally, store a diagnosis result based on the operation and the failure operation.

As the home appliance 101 outputs a predetermined sound through the sound output unit 160, a user may recognize its operation state, whether a failure occurs, or whether it operates abnormally in operation S2. Furthermore, the home appliance 101 may provide a function for outputting a sound that combines transmission information including the diagnosis result and specific frequencies. Such a sound signal may be outputted through a sound output means typically equipped for outputting a notification sound or confirmation sound (or, an additional sound output means for outputting a sound different from that).

Moreover, a user, who recognizes an abnormality of the home appliance 101 through a notification sound outputted from the sound output unit 160, may call the service center 200 to describe an abnormal symptom of the home appliance 101 and may inquire about a corresponding solution or request a repair in operation S3. Of course, regardless of whether a specific sound such as a notification sound is outputted, a user may directly recognize an abnormal operation of the home appliance 101, and may contact the service center 200 in some cases.

While a call is connected to the service center 200, a service center agent may file the complaint of the user, and may attempt to give a corresponding solution. In some cases, specific information on a symptom of a home appliance may be required.

The agent may explain to a user a method of outputting transmission information such as a diagnosis result as sound in operation S4. According to the explanation, a user may put the communication terminal 81 close to the sound output unit 160, and then, may manipulate user input means, equipped in a control panel, in order to output the transmission information including a diagnosis result as a predetermined sound through the sound output unit 160.

If necessary, when a predetermined command is inputted through the input unit 110 of the home appliance 101, in addition to an image, an instruction relating to a the position of sound output, connection to the service center 200, and how to transmit sound to the service center 200 may be displayed on the display unit 117 of the home appliance 101. Accordingly, without description by the service center agent, a user may output and transmit the transmission information of the home appliance 101 as sound in connection to the service center 200.

When the transmission information is outputted as a predetermined sound through the sound output unit 160, the outputted sound signal may be transmitted to the service center 200 via a communication network of the terminal 81 in operation S5.

At this point, the sound outputted from the home appliance 101 may be inputted into the terminal 81, and then the sound signal including a diagnosis result and driving information may be transmitted to a server of the service center 200 via a telephone network of the service center 200 in order to output information on the state of the home appliance 101.

The service center 200 may include a server for receiving and recording a sound signal transmitted via a communication network and storing it. The server may extract the transmission information including the diagnosis result from the sound signal transmitted via the communication network, and may output the diagnosis result of the home appliance 101 and detail data corresponding thereto on the basis of the extracted transmission information in operation S6.

At this point, the server may include a database (DB) for storing detail data such as a failure cause corresponding to the diagnosis result of a home appliance, countermeasures, how to use a home appliance, and additional description.

The service center 200 may confirm the product information of the home appliance 101 according to its outputted state information, and then, may control an operation of the home appliance 101 or describe its state to a user during call connection. If necessary, the service center 200 may dispatch a service man 93 to a home in order to provide a service appropriate to the product state and failure diagnosis of the home appliance 101 in correspondence to the diagnosis result.

At this point, the diagnosis result and data thereon may be transmitted to a terminal of the service man 93, and the service man 30 may use them to help repair the failure in operation S8. The service man 93 may confirm the diagnosis result notified through the equipped terminal, and may visit a user after preparing necessary parts for repair. Since necessary parts are prepared accurately in advance, the number of visits by the service man 93 may be drastically reduced.

Additionally, the diagnosis result may be delivered to a user's e-mail or portable terminal.

Accordingly, in relation to a home appliance system, when a user accesses the service center 200 via a predetermined communication network (for example, a telephone network), the transmission information including the diagnosis result and driving information of the home appliance 101 may be outputted as a predetermined sound and a corresponding sound signal may be transmitted to the service center 200 via a communication network. Then, the service center 200 may accurately determine the state of the home appliance 101 and may deal with it, so that a prompt service becomes available.

Hereinafter, the home appliance 101 is described as a laundry washing machine, as one example, but is not limited thereto, and thus, may be generally applied to a home appliance 1 such as a TV, an air conditioner, a washing machine, a refrigerator, an electric cooker, and a microwave.

At this point, the server may determine whether self-diagnosis is possible on the basis of the product information thereon, and when the product information including driving information, operation information, and failure information, which is not the transmission information from the home appliance, may be outputted as sound, receive it in the same manner, and diagnose the home appliance according to a diagnosis logic stored in the server.

If necessary, the server may receive the product information and then may analyze and convert it in order to diagnose the home appliance. At this point, the terminal 81 (e.g. smartphone) may itself diagnose the home appliance according to its performance, but in some cases the terminal 81, may include only a simple diagnosis function, which is only part of the diagnosis functions for fully diagnosing the state of the home appliance.

Figure 2:
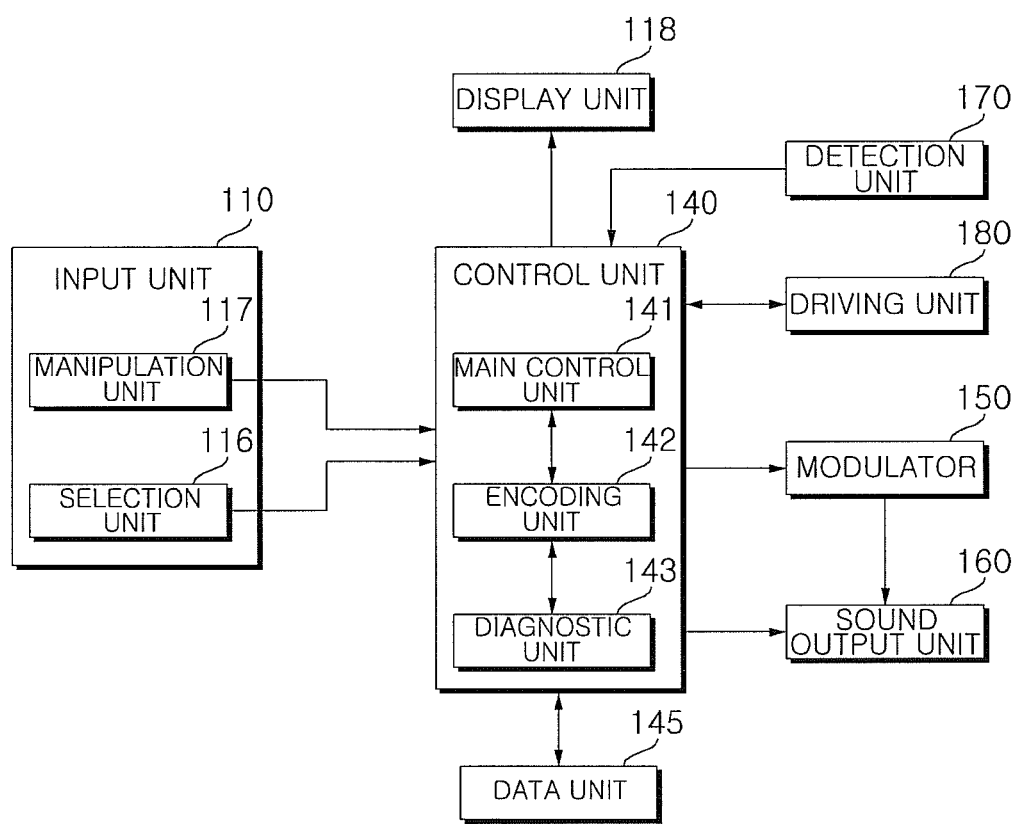
FIG. 2 is a block diagram illustrating a configuration of a home appliance according to an embodiment.

FIG. 2 is a block diagram illustrating a configuration of a home appliance according to an embodiment.

Referring to FIG. 2, the home appliance 101 may include an input unit 110, a display unit 118, a detection unit 170, a data unit 145, a driving unit 180, a modulator 150, a sound output unit 160, and a control unit 140 for controlling an overall operation of the home appliance 101.

The input unit 110 may include at last one input means for inputting a predetermined signal or data to the home appliance 101 and may include a user manipulation unit 117 and a selection unit 116.

The selection unit 116 may include at least one input means, and when a smart diagnosis mode is selected, may send a diagnosis running command to the control unit 140 in order to perform a failure diagnosis and state check of the home appliance 101 according to the product information.

Additionally, once a diagnosis result output is selected, the selection unit 116 may send a signal outputting command to the control unit 140 in order to output the transmission information including the diagnosis result as a predetermined signal through the sound output unit 160.

At this point, the selection unit 116 may be an input means separated from the manipulation unit 117, but if necessary, may operate or be recognized as a selection unit when at least two manipulation units 117 are manipulated simultaneously, or may operate or be recognized as a selection unit when the specific manipulation unit 117 is continuously manipulated or manipulated more than a predetermined time.

Additionally, the selection unit 116 may turn on/off the sound output unit as it enters into a smart diagnosis mode or a diagnosis result outputting mode. That is, when a signal outputting command is inputted by the selection unit 116, in response to the control command of the control unit 140, the transmission information including a diagnosis result may be outputted as a predetermined signal. At this point, the sound output unit 160 may operate in order to output a sound according thereto.

The manipulation unit 117 may receive data such as a driving course and driving setting according to an operation of the home appliance 101, and then, may transmit them to the control unit 140. Additionally, the manipulation unit 117 may receive a setting according to a signal output. That is, the manipulation unit 117 may input a setting value such as how to output a signal and the size of an outputted signal.

At this point, the input unit 110 including the selection unit 116 and the manipulation unit 117 may include a button, a dome switch, a touch pad (static pressure/electrostatic), a jog wheel, a jog switch, a finger mouse, a rotary switch, and a jog dial, and also any devices for generating predetermined input data by press, rotation, pressure, and contact manipulations may be applicable.

The detection unit 170 may include at least one detection means for detecting temperature, pressure, voltage, current, level and the number of revolutions, and may transmit detected or measured data to the control unit 140. For example, the detection unit 170 may measure the level of water during water supply or drain in a laundry washing machine, and may measure the temperature of supplied water, or the rotational speed of a washing machine tub or drum.

The driving unit 180 may control the driving of the home appliance 101 in order to perform a set operation in response to the control signal applied from the control unit 140. Accordingly, a laundry washing machine may perform a series of cycles such as a washing cycle, a rinsing cycle, and a dehydrating cycle in order to remove the pollution of the laundry.

For example, the driving unit 180 may drive a motor that rotates a washing machine tub or drum, and also, may control its operation in order to remove the pollution of the laundry through the rotation of the washing machine tub or drum. Additionally, in response to the control command of the control unit 140, the driving unit 180 may control a valve in order to supply or drain water.

The data unit 145 may store control data for controlling an operation of the home appliance 101 and reference data used during an operation control of the home appliance 101. At this point, the data unit 145 may include all storage means such as ROM and EEPROM where control data on a home appliance can be stored. Additionally, the data unit 145 may include a storage means for temporarily storing data as a buffer of the control unit 140, and DRAM and SRAM may be used for the data unit 145.

When the home appliance 101 performs a predetermined operation, the data unit 145 may store operation information occurring during an operation, driving information such as setting data inputted by the manipulation unit 117 to allow the home appliance 101 to perform a predetermined operation, usage information including the number of specific operations performed by the home appliance 101 and model information of the home appliance 101, and failure information including information on the cause for malfunction or malfunction location when the home appliance 101 operates abnormally.

Additionally, the data unit 145 may store a diagnosis logic for smart diagnosis, data necessary for the diagnosis logic, and a diagnosis result obtained by the diagnosis. At this point, as the diagnosis logic is performed, whether a failure occurs in the home appliance 101 and its state may by diagnosed on the basis or the product information, and a diagnosis result thereof is outputted. At this point, the diagnosis result may be a result obtained by reflecting the operation information and failure information.

Here, the product information may include at least one of identification information such as a product ID, driving information such as a configuration, operation information, and failure information such as error-detecting information.

The identification information may include information for identifying the target to be diagnosed through the diagnostic device, that is, the terminal 81 or a diagnosis server. A diagnostic device described below may be configured to diagnose various home appliances such as a refrigerator, a washing machine, an air conditioner, and a cooking machine, and the product ID may include information on which target is to be diagnosed by the diagnostic device.

The driving information may include information on function settings inputted by a user. The operation information may be information on the operation state of the home appliance 101, which is accumulated in the current data unit 145 as data on the home appliance 101 detected or measured during an operation. The failure information may be information on whether various components constituting the home appliance 101 are operating normally.

The product information may be data including a combination of 0s and 1s, and may be a digital signal readable by the control unit 140.

When a signal is inputted from the selection unit 116 as the home appliance 101 enters into a smart diagnosis mode, the control unit 140 may call the product information stored in the data unit 145 to run the diagnosis logic, so that the diagnosis is performed on the home appliance 101.

Additionally, the control unit 140 may generate and encode the transmission information of a predetermined format including the diagnosis result and the driving information and transmits them to the modulator 150. Additionally, the control unit 140 may control an operation of the sound output unit 160.

The control unit 140 may include: a main control unit 141 for controlling the flow of data inputted to or outputted from the home appliance 101, generating or transmitting a control command according to the data inputted from the detection unit 170, or transmitting the detected data to the driving unit 180 to control an operation of the home appliance 101; a diagnostic unit 143 for diagnosing a failure of the home appliance 101 according to the diagnosis logic and generating a diagnosis result; and an encoding unit 142 for converting the transmission information including the diagnosis result according to an input in order to a predetermined signal.

Once the home appliance 101 enters into a smart diagnosis mode through the selection unit 116, the main control unit 141 may call the product information stored in the data unit 145, and then, may transmit it to the diagnostic unit 143. Additionally, once the diagnosis result output is selected, the main control unit 141 may output a start sound for notifying that the diagnosis result is outputted through the sound output unit 160, and may display a progressing state (that is, the diagnosis result according to the smart diagnosis is outputted) as predetermined data through the display unit 118.

Additionally, when the data encoded in the encoding unit 142 are transmitted to the modulator 150 and then outputted to the sound output unit 160, the main control unit 141 may control the sound output unit 160 in order to output a predetermined notification sound before signal output and after signal output. However, the notification sound before signal output may be omitted if necessary.

At this point, if two sound output unit 160 are provided, the main control unit 141 may control a notification sound and a sound including product information to be outputted to different sound output units 160.

When the home appliance 101 enters into a smart diagnosis mode, the main control unit 141 may control the selection unit 116 and the manipulation unit 117, except a power key to stop operation, and may control the detection unit and driving unit 180 to stop all other operations of the home appliance 101.

Additionally, when one manipulation key in the manipulation unit 117 is inputted according to a configuration of the home appliance 101 after power is applied, the main control unit 141 may control the smart diagnosis mode not to start even when an input is made through the selection unit 116. Especially, when the selection unit 116 is not additionally provided and an input is made by a combination of at least two manipulation keys among a plurality of manipulation keys in the manipulation unit 117 as if the selection unit 116 does, only if an input is made by a combination of designated keys without another input after the power key is inputted, the smart diagnosis mode may start.

When the home appliance 101 enters into the smart diagnosis mode by an input of the selection unit 116 and a diagnosis running command is inputted, the diagnostic unit 143 may call the product information stored in the data unit 145 and may analyze the data according to the diagnosis logic, in order to diagnose the home appliance 101.

Additionally, when each set operation is completed or an error occurs during an operation of the home appliance 101, the diagnostic unit 143 may diagnose the home appliance 101 in correspondence to the product information.

At this point, the diagnosis logic may be an algorithm designed to determine whether a failure occurs in the home appliance 101 on the basis of whether each data satisfy a designated conditional expression by using the data of each product information, and may output its result. At this point, the diagnosis logic may be an algorithm to determine whether each data of especially the operation information and failure information in the product information, and its generated diagnosis result may be a result obtained from the configuration and failure information.

The diagnostic unit 143 may diagnose a failure and state of the home appliance 101 on the basis of the product information by running such a diagnosis logic.

When a diagnosis result outputting command is inputted, the encoding unit 142 may generate a predetermined format of transmission information by calling the diagnosis result and driving information stored in the data unit 145, and at this point, the transmission information may further include an indicator, which is version information on smart diagnosis and order information on diagnosis result.

At this point, the transmission information may include at least two diagnosis results, more preferably, three diagnosis results, and information on the order in which the diagnosis results were generated may be included in the indicator. The driving information may be selectively included in the transmission information according to the priority of a configuration set and inputted during an operation of a corresponding home appliance in relation to the product information used for drawing each diagnosis result. At this point, the priority may vary depending on a setting.

The encoding unit 142 may encode the transmission information according to a designated predetermined method, and may add a preamble and an error check bit to a data signal in order to generate a predetermined format of a control signal. The encoding unit 142 may control the transmission information not to exceed 6 bytes and, when the transmission information is outputted as sound through a sound output unit, may generate a predetermined format of a signal in order for its total output time not to exceed 3 sec.

The encoding unit 142 may encode the transmission information in order to generate a control signal including a plurality of symbols. At this point, the encoding unit 142 may generate a control signal in one frame. Moreover, according to the priority of the diagnosis result and driving information, the encoding unit 142 may designate the position of a control signal in one frame, and then, may generate the control signal.

The encoding unit 142 may generate a predetermined format of a control signal, and then, may transmit the control signal to the modulator 150. At this point, the control unit 140 may change the number of symbols corresponding to an outputted frequency signal, according to the number of frequencies used in the modulator 150.

In response to a control signal applied from the control unit 140, the modulator 150 may apply a predetermined driving signal to the sound output unit 160 in order to output a predetermined frequency of a sound signal through the sound output unit 160 by applying a predetermined driving signal to the sound output unit 160.

Especially, when a sound signal is outputted, the modulator 150 may apply a signal to the sound output unit 160 in order to output a frequency signal, which is designated in correspondence to at least one symbol, with respect to a symbol (a unit of data constituting the control signal), for a symbol time.

The modulator 150 may output a signal in response to a control signal by using a plurality of frequency bands, and the control unit 140 may change the number of symbols per frequency according to the number of frequencies in use in response to the setting of the control unit 140, and then, may output it.

At this point, the modulator 150 may generate a frequency signal through a quadrature frequency shift keying "QFSK" method. Accordingly, a frequency signal generated by the modulator 150 may include a combination of four different carrier frequencies.

Here, the modulator 150 may convert a signal by using a frequency signal having different values of less than 2 kHz, and each frequency value may have one of frequency values constituting a scale.

Especially, frequency values constituting a scale may be used. For example, frequency values may be 1396 Hz, 1567 Hz, 1760 Hz, and 1975 Hz. Such values may have F, G, A, B of six octaves based on 12 scales. Here, carrier frequencies may be taken not to be adjacent scales, and this is for providing a difference in frequency values in order to clearly distinguish each carrier frequency.

Since carrier frequencies have values constituting a scale, a sound signal outputted through the sound output unit 160 may satisfy the emotional aspect of a user, and since there is enough difference between the values, frequencies are clearly distinguished, and a communication success rate is improved.

The sound output unit 160 may be turned on/off in response to a control command of the control unit 140, and may output a signal of a predetermined frequency corresponding to the frequency signal for a predetermined time according to a control of the modulator 150, so that transmission information including a diagnosis result and driving information is outputted as sound. At this point, at least one sound output unit 160 may be equipped.

The sound output unit 160 may output a sound signal according to the frequency signal, and may be implemented with a buzzer or a speaker. The sound output unit 181 may be a buzzer for outputting four carrier frequencies which are separately distinguished in a frequency band of less than 2 kHz.

The sound output unit 160 may output a predetermined sound signal in correspondence to an output from the modulator 150, and then, when the output is completed, may stop its operation. When the selection unit 116 is manipulated again, the sound output unit 160 may output transmission information including a diagnosis result and driving information as a predetermined signal through the above process.

The display unit 118 may display information inputted by the selection unit 116 and the manipulation unit 117, operating state information on the home appliance 101, information on the operation completion of the home appliance 101, on a screen. Additionally, when the home appliance 101 operates abnormally, failure information on malfunction may be displayed on a screen.

Additionally, when the smart diagnosis mode starts in response to a control command of the main control unit 141, the display unit 118 may display the smart diagnosis mode, and also, may display a progressing state according to a failure diagnosis or diagnosis result output of a home appliance in at least one form of a character, an image, and a number. Additionally, a diagnosis result may be outputted.

At this point, the home appliance 101 may further include an output means such as a light emitting lamp and a vibration device besides the sound output unit 160 and the display unit 118.

Figure 3:
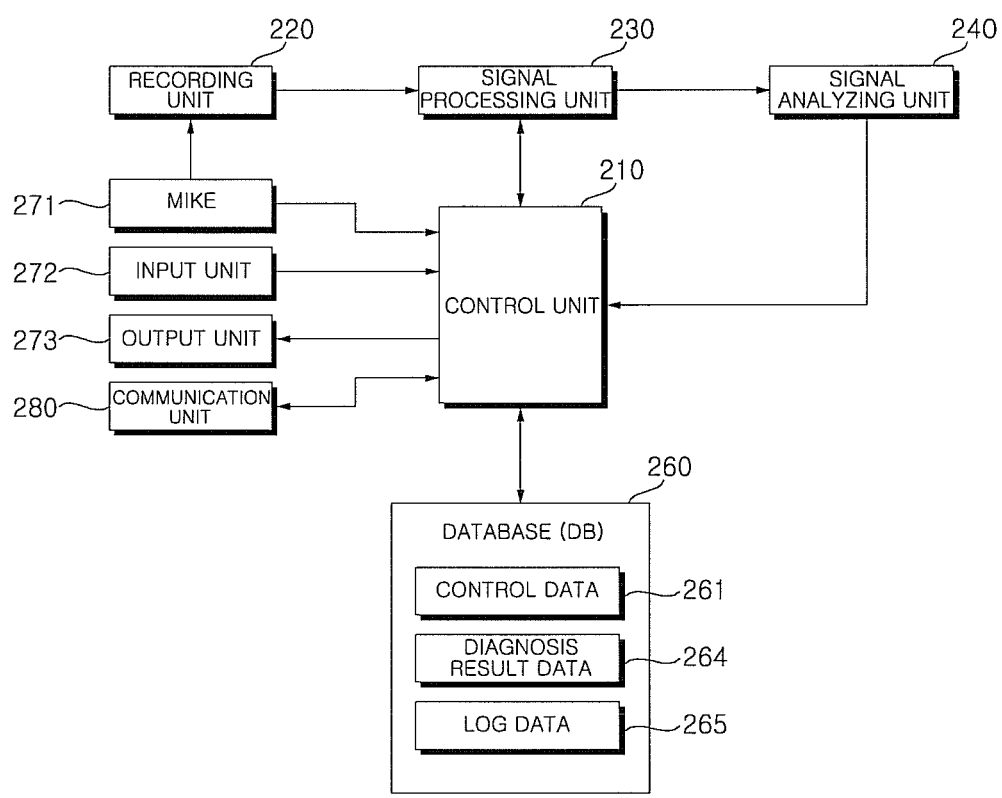
FIG. 3 is a block diagram illustrating a configuration of a server in a service center for managing a home appliance according to an embodiment.

FIG. 3 is a block diagram illustrating a configuration of a diagnostic device for diagnosing a home appliance according to an embodiment.

Referring to FIG. 3, the diagnostic device may include a microphone ("mike") 271, an input unit 272, an output unit 273, a communication unit 280, a signal processing unit 230, a signal analyzing unit 240, a database (DB) 260, and a control unit 210 for controlling the overall operation of the diagnostic device.

According to a manipulation of the input unit 272, a diagnostic program for home appliance may be executed, and as a recording button is inputted, the recording unit 220 may start to record a sound inputted through the microphone ("mike") 271.

The output unit 273 may display various information including a diagnosis progressing situation or diagnosis result of a home appliance. Additionally, an alarm sound or effect sound may be outputted. Additionally, how to set up a home appliance for diagnosis and the position of a signal inputted from a home appliance may be displayed on a screen of the output unit 273.

The microphone (mike) 271 may receive an ambient sound. When product information is converted into a predetermined signal and outputted as sound from a home appliance, the diagnostic device may receive the signal outputted from the home appliance through the microphone (mike) 271, and may input the received signal into the recording unit 220.

When a home appliance is connected to a diagnostic device via a communication network if necessary, the communication unit 280 may receive a signal transmitted from the home appliance.

The recording unit 220 may record a signal received through the microphone (mike) 271. The recording unit 220 may record a signal received through the microphone (mike) 271 in a wave file format. At this point, the diagnostic device may include a recording medium such as RAM, hard disk, and Nand Flash Memory for recording a sound signal file.

The signal processing unit 230 may convert the inputted signal to extract product information, and then, may transmit it to the diagnostic unit 250.

When a signal is recorded by the recording unit 220, the signal processing unit 230 may demodulate and decode a wave file constituting a signal in order to extract product information. Additionally, when a signal is received through the communication unit 280, the signal processing unit 230 may convert the signal according to a used communication method and signal file format in order to extract product information.

Hereinafter, the case that the signal processing unit 230 converts a recorded signal in order to extract product information will be described.

The signal processing unit 230 may store bit stream data for recorded analog signal, and detects its preamble, and then, based on this, may extract transmission information on a home appliance from a sound signal. Through this process, the signal processing unit 230 may demodulate the recorded data, and may decode the demodulated data in order to extract transmission information. At this point, the transmission information may include a diagnosis result and driving information of a home appliance.

A signal conversion in the signal processing unit 230 may be a reverse conversion to a signal conversion in a home appliance, and each of the home appliance and the terminal 81 (i.e. a diagnostic device) may convert the data by using the same signal conversion system through a mutual agreement. For example, the signal processing unit 230 may decode the data by using a Viterbi decoding algorithm in correspondence to an encoding method of a home appliance. The signal processing unit 230 may perform reverse conversion on an analog sound signal of a predetermined frequency band by using one of frequency shift keying, amplitude shift keying, and phase-shift-keying.

Once a signal conversion is completed by the signal processing unit 230, the signal analyzing unit 240 may detect an error, which occurs when a signal is outputted from a home appliance and then is recorded and stored, and may determine whether the signal is normal. Additionally, the signal analyzing unit 240 may examine an error when a signal is received via a communication network.

At this point, the signal analyzing unit 240 may analyze the recorded data in order to examine whether the signal is recorded normally or the recorded signal is normal. Additionally, after product information is extracted, the signal analyzing unit 240 may examine whether the data on the extracted product information is normal.

The signal analyzing unit 240 may perform a predetermined correction process for correcting an error detected from an error detection operation, but in some cases, even when a correction process is performed, it may be difficult to restore the normal data.

When error information is inputted, the control unit 210 may output that signal recording is not normal through the output unit 273, and may request a signal retransmission to a home appliance. At this point, a user may manipulate a home appliance again according to error information and a signal retransmission request displayed on a terminal, and then, may output a signal.

When a signal is normal, the signal analyzing unit 240 may complete recording, and the control unit 210 may display a message for notifying that recording is normally completed through the output unit 273.

When, the signal analyzing unit 240 determines that a signal is normal, the control unit 210 may output the transmission information, which is extracted from the signal processing unit, through the output unit 273.

Additionally, the control unit 210 may output the diagnosis result and driving information in the transmission information, the product ID on product, and the version information, but may output the diagnosis result in a predetermined order according to an indicator value.

At this point, the control unit 210 may calls detail data corresponding to each diagnosis result from the database (DB) 260, and then, may output them in addition to the diagnosis result.

At this point, the detail data may include a failure cause corresponding to a corresponding diagnosis result value, countermeasures for failure, how to use a related home appliance, or additional description, in relation to each diagnosis result. That is, a home appliance may output a diagnosis result as a predetermined code, and a server receives it in order to output detail data corresponding to the diagnosis result.

The database (DB) 260 may store control data 261 on a server operation and signal process, the transmission information extracted by the signal processing unit 230 and its diagnosis result data 263, and log data 265 on a diagnosis result for each home appliance.

Additionally, the database (DB) 260 may store detail data corresponding to each diagnosis result. At this point, as mentioned above, the detail data may include a failure cause corresponding to a diagnosis result, countermeasures for failure, how to use a related home appliance, or additional description, and further may include a list of replacement components necessary for AS in relation to a failure.

At this point, the log data 265 may be additionally stored according to the type and model of a home appliance, i.e. a diagnosis target.

The control unit 210 may display the diagnosis result and detail data in the transmission information through the output unit 273.

At this point, when voice guidance is necessary for a user connected to a call in relation to a diagnosis result, the control unit 210 may output information thereon. Also, when a repair is necessary, the control unit 210 may reserve a dispatch schedule, and then, may transmit a diagnosis result and data thereon to the terminal of a technician, who checks and repairs the home appliance.

Figure 4:
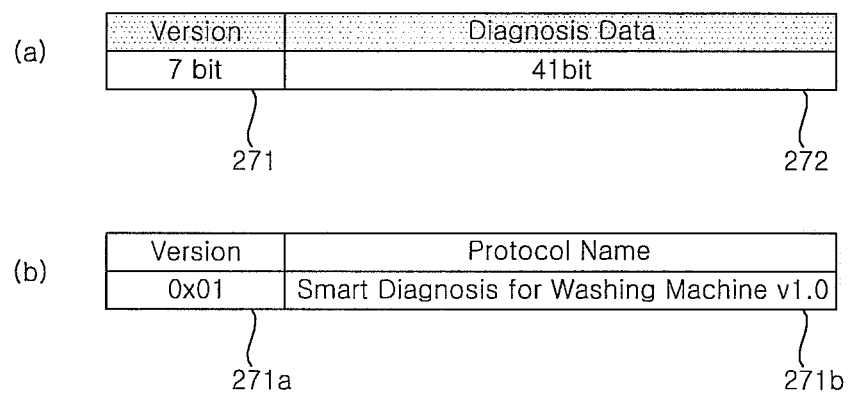
FIG. 4 is a view illustrating a data structure of a signal outputted from a home appliance.

FIG. 4 is a view illustrating a data structure of a signal outputted from a home appliance in accordance with the present disclosure.

Transmission information on the home appliance may be outputted as a predetermined form of a sound signal, and then, may be inputted to a server of the service center 200 through a terminal. At this point, product information may be transmitted to the server of the service center 200 via a telephone network, a mobile communication network, or a wired or wireless communication network, which is connected to the terminal 81, by using a sound signal outputted from the home appliance.

Referring to FIG. 4A, the home appliance may store driving information occurring or measured during an operation, operation information (that is, a setting value inputted for each operation), and failure information on error occurrence as product information, and then, may analyze the information according to a pre-stored diagnosis logic in order to generate a diagnosis result.

The control unit 140 may add version information 271 on diagnosis data 272 including the generated diagnosis result and driving information in order to generate transmission information. At this point, the diagnosis data 272 may further include a product ID, i.e. an identifier for identifying a product and an indicator, i.e. order information on a diagnosis result.

At this point, the version information 271 may relate to a smart diagnosis algorithm or entire smart diagnosis system, as the version of a smart diagnosis, and the version information on a smart diagnosis may refer to protocol name information corresponding thereto.

For example, as shown in FIG. 4B, when a Version is displayed with 0x01(271a), a Protocol Name 271b may refer to 'Smart Diagnosis for Washing Machine v1.0'. The product ID may be an identifier for identifying a product, and failure diagnosis data may be used for failure diagnosis of a home appliance.

The version information may include 7 bits and the diagnosis data may include 41 bits. If the diagnosis result in the diagnosis data has three times of a diagnosis result, it may have 21 bits, an indicator for the diagnosis result may have 18 bits, and the driving information may have 18 bits. Thus, a total of 41 bits may be used. The transmission information including the version information and the diagnosis data may be configured with a total of 48 bits, that is, 3 bytes.

Advantageously, in relation to the driving information, only some (predetermined) data, which are selected based on a priority among a plurality of data according to an operation setting, is included in the diagnosis data. For example, in relation to the driving information, a course, the temperature of wash water, a user program, a child lock setting, a sound output level, a dehydration speed, and the number of operations may be selectively included in the diagnosis data. That is, predetermined data for diagnosis is selected from the driving information. In other words, only a selected subset of the driving information is included in the diagnosis data. The chosen driving information for the subset may be selected based on assigned priorities. The skilled person will understand that the assigned priorities may be changed and may, for example, be dependent on the failure information.

Accordingly, only the most relevant driving information is provided in the diagnosis result. Advantageously, this reduces the overall signal time, enables more focused diagnosis at the server (if required) and enables useful and relevant information about failing products to be captured at a server.

The version and product ID may be directly inputted to a diagnosis logic in use from the diagnostic unit in the control unit of a home appliance. On the contrary, diagnosis data may be stored in the data unit 145 of the home appliance.

Once a smart diagnosis is executed, the control unit 140 in a home appliance may diagnose the home appliance by using the product information pre-stored in a diagnosis mode and the diagnosis logic (i.e. a diagnosis algorithm), may generate a diagnosis result thereon, and then, may generate transmission information including at least one pre-generated diagnosis result when the diagnosis result in an output mode in order to output the transmission information as a predetermined sound through the sound output unit 160.

At this point, the server of the service center 200, which receives the sound signal outputted from the home appliance, may convert and analyze the sound in order to extract the transmission information, may confirm the version in the transmission information, identifies the type and model of the home appliance through the product ID, calls detail data corresponding to the diagnosis result, and then, may output the detail data in addition to the diagnosis result.

Accordingly, a user may confirm the diagnosis result and the detailed description thereon through the terminal 81. At this point, an agent may confirm the diagnosis result and the detail data in order to provide voice guidance to user, or transmit an e-mail or message to a user's terminal.

Figure 5:
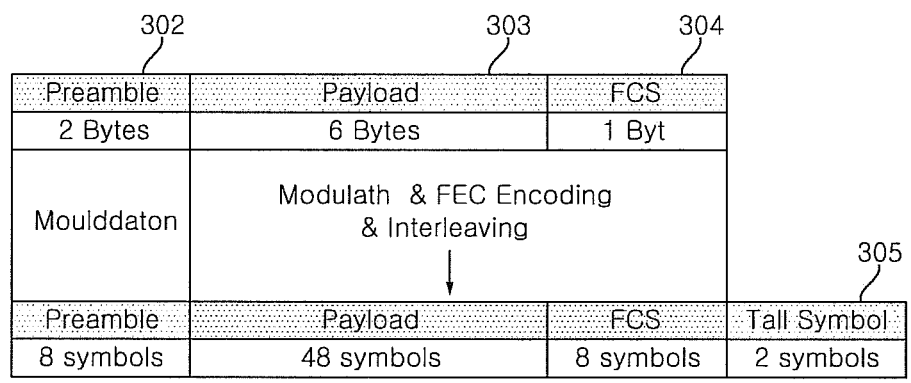
FIG. 5 is a view illustrating a configuration of a signal after data of a signal outputted from a home appliance are converted.

FIG. 5 is a view illustrating a configuration of a signal after data of a signal outputted from a home appliance are converted.

The encoding unit 142 may encode the version information and the diagnosis data 282 of a total of 48 bits (i.e. 6 bytes), that is, the transmission information, in order to output it as sound.

At this point, the encoding unit 142 may generate a frame including a plurality of symbols through encoding and interleaving processes by using the transmission information, and during the processes, symbols corresponding to a Frame Check Sequence (FCS), a Tail symbol, and a preamble may be added. The FCS may be added data for performing an error detection process (for example, a CRC-8 method) in order to identify whether a frame is correctly transmitted.

As shown in FIG. 5, the encoding unit 142 may add the preamble and the FCS for error detection on the payload, i.e. the transmission information, to have a total of 9 bytes, and then, may encode them differently.

Such an encoding method may vary, and thus, may include a ½ Convolution Encoding method, for example. Especially, the ½ Convolution Encoding method may be used in a forward error correction (FEC) method for recovering a symbol error, and in order to restore a bit error, may use a convolutional code through the FEC method.

The encoding may be based on a ½ code rate (i.e. one bit is inputted and two bits are outputted). At this point, since the ½ code rate requires a lot of redundant bits, a puncturing algorithm may be used in order to reduce the number of redundant bits.

Additionally, the tail symbol may be an additional symbol generated during a convolutional encoding process.

The interleaving may be a technique for mixing the order of symbols and transmitting them, which is used when continuous errors occur during sound signal transmission. The interleaving process may interleave the sections of the payload corresponding to diagnosis data and the tail symbol.

Moreover, the sound signal outputted according to the configured frame through the home appliance may be transmitted to the server through the input from the external terminal 81 and a communication network. Then, the server may detect the preamble according to a pre-agreed protocol, and may obtain the transmission information, that is, diagnosis data (i.e. payload) through deinterleaving, tail symbol detecting, decoding, and FCS detecting processes.

Especially, the decoding may use a Viterbi decoding algorithm, which is easily executed on PC-based software, and such an algorithm may be advantageous to reduce errors in a way of selecting bit patterns having less error from all expectable bit patterns.

Through the above processes, the frame according to an embodiment may include a preamble having 8 symbols, a payload having 48 symbols (this correspond to 6 bytes of data in an application layer), an FCS having 8 symbols, and a tail symbol having two symbols.

At this point, a total time for outputting the frame may be set not to exceed 3 sec, and a time for outputting each symbol, that is, a symbol time, may be set not to exceed 45 ms.

The inventors have found that, when the symbol time is set too short, an echo effect between carrier frequencies outputted in correspondence to each symbol causes signal interference. Therefore, in theory, the symbol time should be set as long as possible.

However, in order to provide the above frame and output a sound signal within 3 sec completely, the inventors have found that, advantageously the maximum symbol time may be between 40 ms and 45 ms. In the case of 45 ms, since a total output length of a sound signal is extremely close to 3 sec, noise reduction function may be applied due to delay during signal processing according to the external terminal 230. Therefore, a symbol time of 44 ms may be considered. In this case, all sound signals may be completely outputted within 2.90 sec, and approximately 100% of a communication success rate may be confirmed with almost all terminals.

FIG. 6 is a view illustrating a diagnosis logic and a diagnosis result according thereto in a home appliance.

The diagnosis logic in the home appliance, as shown in FIG. 6, may diagnose an abnormal operation of the home appliance on the basis of a plurality of data of stored product information such as driving information, operation information, and failure information.

For example, when the error A 201 occurs, data values of a and b (i.e. related data for identifying a corresponding error or phenomenon) may be determined based on a predetermined conditional equation in order to diagnose the error A 201. The diagnosis result on the error A 201 may be divided into results 101, 102, and 103, separately, and each may have a different cause and countermeasure. When the diagnosis result 101 on the error A 201 is derived, it is stored. At this point, the diagnosis result may be stored as a predetermined code value.

Additionally, in relation to the error C 203, data values of d and e may be compared based on a conditional equation, and then, may be divided into an abnormal case and a normal case. When it is the abnormal case, the diagnosis result 106 may be derived.

As mentioned above, the diagnosis algorithm in a home appliance may select specific data according to an error code or phenomenon occurring based on product information including a plurality of data on the home appliance, and may determine whether the data satisfy a plurality of conditional equations in order to diagnose abnormality. Since a plurality of data relate to one error or phenomenon, the number of conditional equations according thereto may vary depending on each error, and also, a plurality of diagnosis results thereon may be provided.

Such a diagnosis logic may be included in a server, if necessary, and in the case of a home appliance having no self-diagnosis, product information may be outputted as sound and a service diagnoses a corresponding home appliance by using the diagnosis logic. At this point, the server may determine whether a diagnosis is possible by using the version information and product number, and according thereto, may differently process signals.

Figure 7:
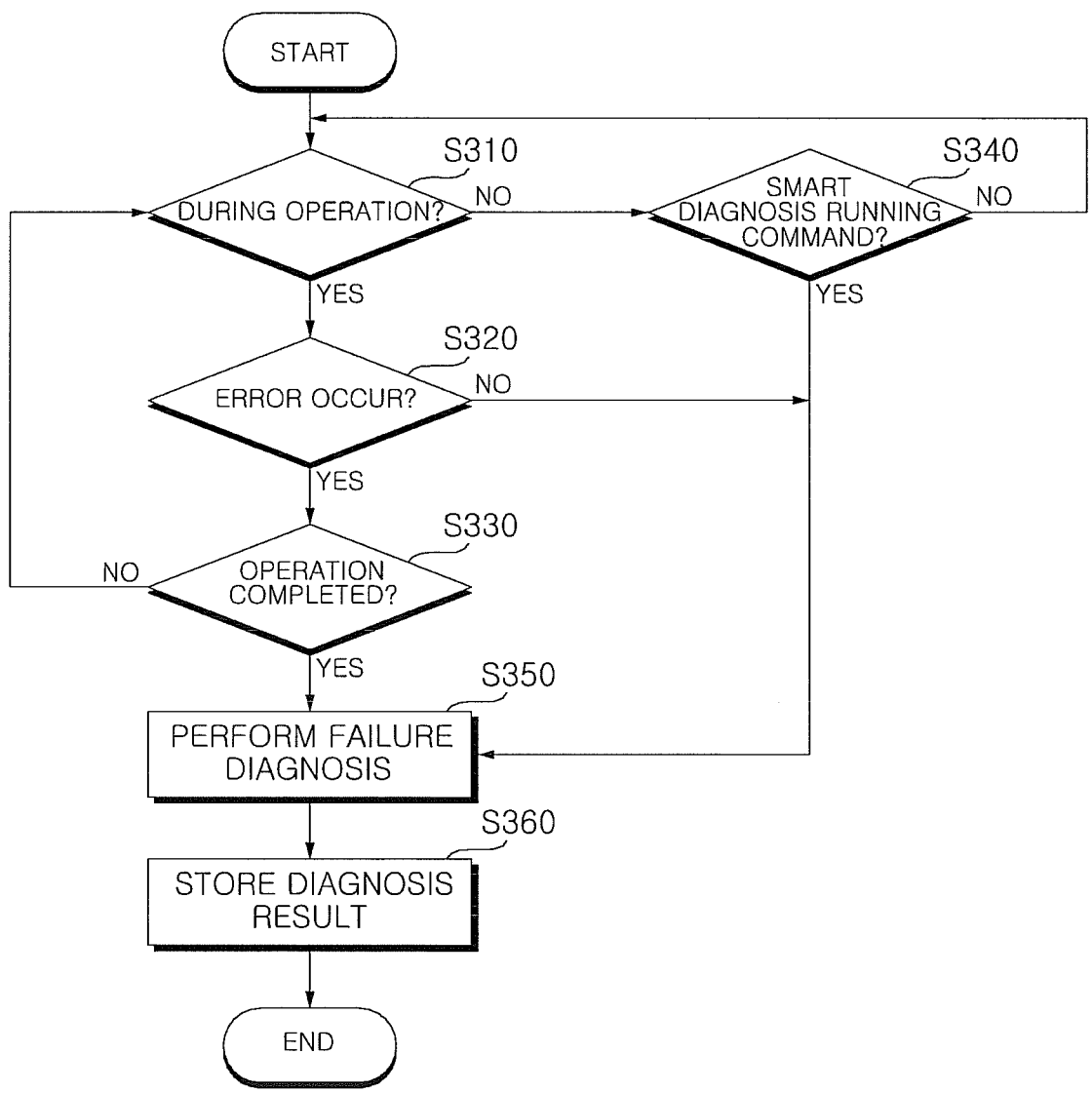
FIG. 7 is a flowchart illustrating a method of diagnosing a home appliance and generating its diagnosis result according to an embodiment.

FIG. 7 is a flowchart illustrating a method of diagnosing a home appliance and generating its diagnosis result according to an embodiment.

Referring to FIG. 7, when a driving setting is inputted and a predetermined operation is performed according thereto in an operation state in operation S310, if an error occurs during the operation in operation S320, the control unit 140 may control the diagnostic unit 143 to run a diagnosis logic on the basis of pre-stored production information, and then, may perform failure diagnosis on the home appliance in operation S350.

Additionally, when an operation is performed according to the driving setting and is completed without an error in operation S330, the diagnostic unit 143 may perform a failure diagnosis on the basis of the product information stored until the operation completion in operation S350. At this point, the diagnostic unit 143 may diagnose each of wash completion rinse completion, and dehydration completion in considering each cycle of washing, rinsing, and dehydrating as one operation, and or may diagnose each operation after all operations such as washing, rinsing, and dehydrating are completed. This may vary depending on a setting.

Moreover, when a smart diagnosis running command is inputted through the input unit 110 without an operation of the home appliance in operation 5340, the main control unit 141 may stop another operation or ignore an input after that, and the diagnostic unit 143 may perform a failure diagnosis on the home appliance in operation S350.

The diagnostic unit 143 may generate a diagnosis result on each case once the failure diagnosis is executed, and may store it in the data unit 145 in operation 5360. At this point, driving information according to an operation setting may be also stored.

Figure 8:
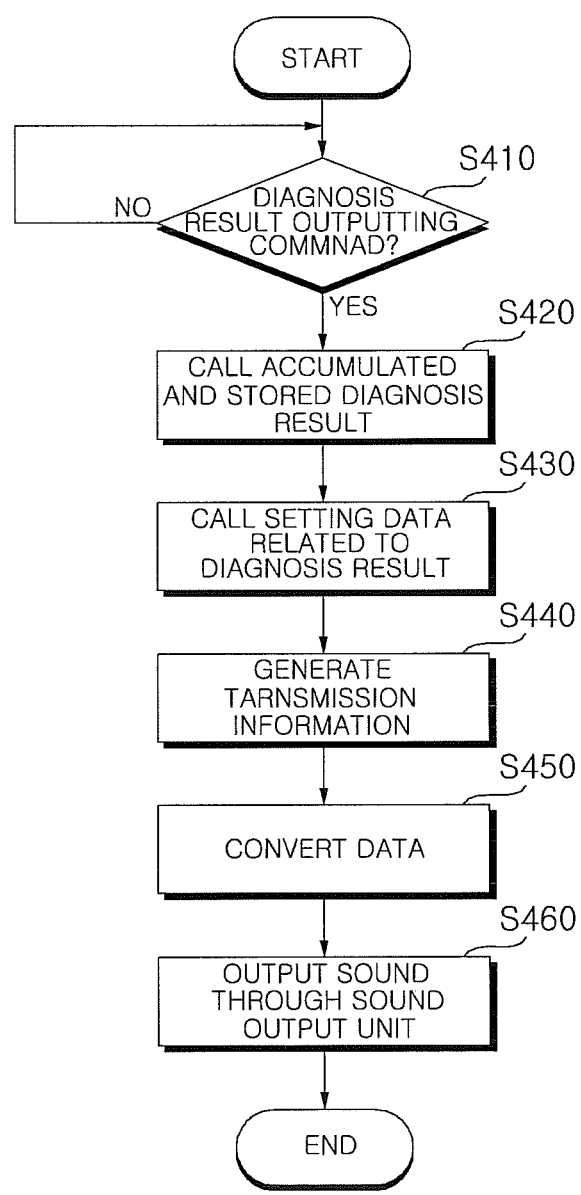
FIG. 8 is a flowchart illustrating a method of outputting transmission information in a home appliance according to an embodiment.

FIG. 8 is a flowchart illustrating a method of outputting transmission information in a home appliance according to an embodiment.

Referring to FIG. 8, once a command on outputting the diagnosis result according to the smart diagnosis is inputted through the input unit 110 in operation S410, the control unit 140 may call the diagnosis result, which is obtained and accumulated before. At this point, the control unit 140 may call at least two diagnosis results (more preferably, three diagnosis results). Additionally, the control unit 140 may call driving information in the diagnosis result, that is, setting data related to an operation of the home appliance, in operation 5430. For example, a self-diagnosis may be performed after each wash cycle. Accordingly, a series of diagnosis results may be stored. It can be understood that earlier diagnosis results may contain relevant information for a current fault.

The encoding unit 142 may add an indicator (i.e. the order information on the diagnosis result) and the product ID of the home appliance on the diagnosis result and driving information, and also, may further add the version information on the smart diagnosis thereon in order to generate transmission information in operation S440.

The encoding unit 142 may be a preamble and data for error detection on the transmission information, may encode and convert the transmission information in order to generate frame data for sound output, and then, may transmit the frame data to the modulator 150.

The modulator 150 may convert the frame data into a plurality of frequency signals in operation 5450, and then, may output them through the sound output unit 160. At this point, the sound output unit 160 may output a sound signal including a frequency signal constituting a scale in operation S460.

The outputted sound signal may be transmitted to the service center 200 through the terminal 81.

Figure 9:
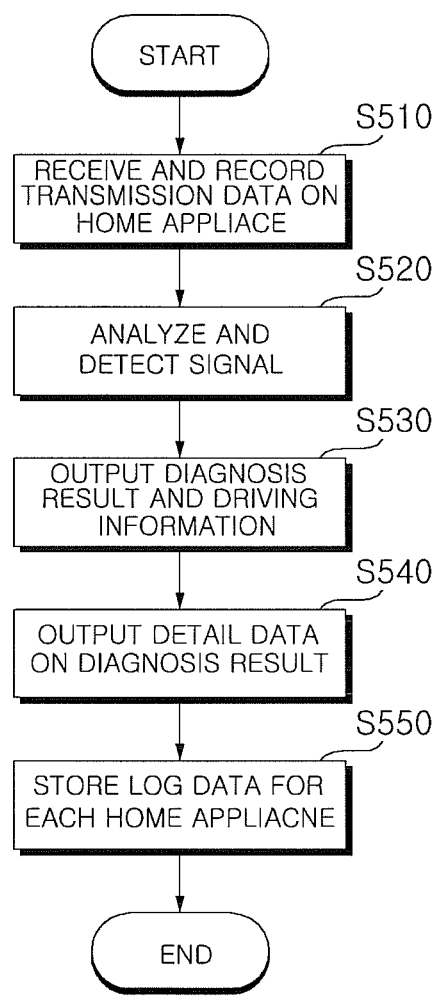
FIG. 9 is a flowchart illustrating a method of a server in a home appliance system to output a diagnosis result according to an embodiment.

FIG. 9 is a flowchart illustrating a method of a server in a home appliance system to output a diagnosis result according to an embodiment.

Referring to FIG. 9, a server of the service center 200 may receive and record a sound signal outputted and transmitted from the home appliance.

The signal processing unit 230 may perform reverse conversion on the recorded signal and analyzes it in order to extract the transmission information from the home appliance in operation S520. Additionally, the signal analyzing unit 240 may determine whether the recorded signal and the extracted transmission information are normal data.

If the transmission information is normal data, the control unit 210 may divide the diagnosis result by the type of a home appliance according to the version information and product number included in the transmission information, and then, may output the diagnosis result and driving information in operation S530.

At this point, the control unit 210 may call detail data corresponding to each diagnosis result from the DB 260, and then, may output them in addition to the diagnosis result in operation S540. Accordingly, corresponding failure cause and countermeasure therefore may be outputted as detail data, and also, a guide on additional related information and a method of using a home appliance may be outputted.

The control unit 210 may provide a guide on failure to a user, or may reserve a repair schedule and dispatch a service man.

Additionally, the control unit 210 may generate log data on each home appliance with respect to the diagnosis result and stores the log data in the DB 260 in operation S550.

The control unit 210 may accumulate and store the generated log data, and may periodically transmit the log data to a user at each set period in order to provide information on failure history.

Thus, according to the present disclosure, a home appliance outputs and transmits data within a short period of time, thereby minimizing data loss during transmission, and also, as a server receives data more accurately, home appliance repair becomes more easier and effective management on a home appliance is improved. Therefore, reliability on a product may be improved.

As above, the home appliance and its system according to the present disclosure are described with reference to the accompanying drawings, but the present disclosure is not limited to the embodiments above, and thus, may be applicable within the technical scope of the present disclosure.

The home appliance and its system according to the present disclosure perform a diagnosis on the home appliance, output result data thereon as a predetermined sound within a short period of time, and then, transmit it to a server. As a result, data on a home appliance may be accurately transmitted.

Furthermore, according to the present disclosure, a large amount of data on a home appliance are not transmitted, but since transmission information including a diagnosis result and some driving information is converted and outputted, only a small amount of data are used to confirm a state of the home appliance and faster service response is possible. As a result, effective management is possible.

Although the preferred embodiments have been disclosed for illustrative purposes, those skilled in the art will appreciate that various modifications, additions and substitutions are possible, without departing from the scope and spirit of the disclosure as disclosed in the accompanying claims.

What is claimed is:

1. A home appliance comprising:
    an input unit for inputting driving information;
    a data unit for storing a diagnosis logic;
    a control unit for diagnosing a state of the home appliance and whether a failure has occurred according to the diagnosis logic on the basis of product information including the driving information, operation information detected during operation, and failure information occurring during an operation, in order to generate a diagnosis result including the operation information and the failure information, and encoding transmission information including a subset of the driving information, and the diagnosis result, and outputting the encoded transmission information;
    a modulator for converting the encoded transmission information; and
    a sound output unit for outputting the transmission information converted by the modulator as a sound including a plurality of frequencies.

2. The home appliance of claim 1, wherein the control unit selects the subset of driving information based on a priority on each data among data included in the driving information.

3. The home appliance of claim 2, wherein the control unit generates the transmission information including version information on a diagnosis algorithm and an index on the diagnosis result.

4. The home appliance of claim 1, wherein the transmission information comprises at least two diagnosis results.

5. The home appliance of claim 4, wherein the control unit generates the transmission information including three diagnosis results.

6. The home appliance of claim 1, wherein the transmission information is less than 6 bytes.

7. The home appliance of claim 1, wherein the sound is output for less than 3 seconds.

8. The home appliance of claim 1, wherein the subset of driving information comprises 18 bits and/or the diagnosis result comprises 21 bits.

9. The home appliance of claim 1, wherein when a diagnosis running command is inputted from the input unit, each set operation is completed, or an error occurs during an operation, the control unit performs a diagnosis on the home appliance in correspondence to the product information.

10. The home appliance of claim 1, wherein the modulator converts the encoded data through a combination of at least two different frequencies.

11. A home appliance system, comprising:
    a home appliance as claimed in claim 1;
    a server for receiving the sound outputted from the home appliance and outputting a diagnosis result on the home appliance; and
    a terminal for transmitting the sound outputted from the home appliance to the server via a predetermined communication network,
    wherein the server analyzes the sound and extracts the diagnosis result, and outputs the diagnosis result and detail data corresponding to the diagnosis result.

12. The home appliance system of claim 11, wherein the server comprises a database for storing the diagnosis result and the detail data corresponding to the diagnosis result, and stores a diagnosis history on the home appliance in the database as log data in correspondence to the diagnosis result.

13. The home appliance system of claim 11, wherein the database stores the detail data, which includes at least one of a failure cause corresponding to the diagnosis result, a countermeasure for the failure cause, additional description for the failure, and a method of using the home appliance, by each diagnosis result.

14. The home appliance system of claim 11, wherein the server periodically transmits data on the diagnosis history on the home appliance to the home appliance and the terminal according to a set period.

15. A method of operating a home appliance, the method comprising:
    receiving driving information to perform a predetermined operation;
    storing diagnosis logic for diagnosing a failure in the home appliance;
    diagnosing a state of the home appliance and whether a failure has occurred according to the diagnosis logic on the basis of product information including the driving information, operation information detected during operation and failure information occurring during operation;
    generating a diagnosis result including the operation information and the failure information;
    encoding transmission information including a subset of the driving information and the diagnosis result; and
    outputting the transmission information as sound having a plurality of frequencies.

* * * * *